United States Patent [19]

Schnorf

[11] Patent Number: 5,296,678

[45] Date of Patent: Mar. 22, 1994

[54] VEHICLE SUN VISOR HAVING AN ELECTRIC FAN AND HEATER ASSEMBLY FOR CLEARING THE VEHICLE WINDSHIELD

[76] Inventor: Allen C. Schnorf, 18807 E. 5th St. N., Independence, Mo. 64056

[21] Appl. No.: 850,046

[22] Filed: Mar. 12, 1992

[51] Int. Cl.$^5$ .................... F24H 3/04; B60J 3/00; H05B 1/00

[52] U.S. Cl. .................... 219/203; 165/42; 296/97.1; 296/97.5; 392/360; 392/363; 392/372; 454/208; 454/212

[58] Field of Search ............... 219/203; 392/372, 363, 392/360; 454/208, 212; 165/41, 42; 296/97.1, 97.5

[56] References Cited

U.S. PATENT DOCUMENTS

| | | | |
|---|---|---|---|
| 1,995,769 | 3/1935 | Fiege | 219/203 |
| 2,048,985 | 7/1936 | Akester | 454/208 |
| 2,064,498 | 12/1936 | Shackford et al. | 219/203 X |
| 2,152,614 | 3/1939 | Younger | 454/212 X |
| 2,675,588 | 4/1954 | Simons et al. | 392/372 |
| 3,009,409 | 11/1961 | Weaver | 454/212 X |
| 3,331,302 | 7/1967 | Baumann et al. | 454/212 X |

FOREIGN PATENT DOCUMENTS 1371399  7/1964  France .................. 392/372

Primary Examiner—Anthony Bartis
Attorney, Agent, or Firm—Litman, McMahon & Brown

[57] ABSTRACT

The conventional sun visor of a vehicle is provided with a fan system including a heater for defrosting and defogging the vehicle windshield. The fan system includes a fan subassembly body mounted in an opening in the sun visor by a retainer subassembly including first and second retainer frames having flanges insertable into the fan subassembly body for securing it in the visor opening. First and second grills are mounted over the faces of the subassembly body by mechanical fasteners which extend through the body and retainer frames. An electric heating element is mounted on at least one of the grills for heating the airstream geneated by the fan of the fan subassembly. The fan and heating element are selectively powered by the vehicle electrical system through an on-off switch.

16 Claims, 1 Drawing Sheet

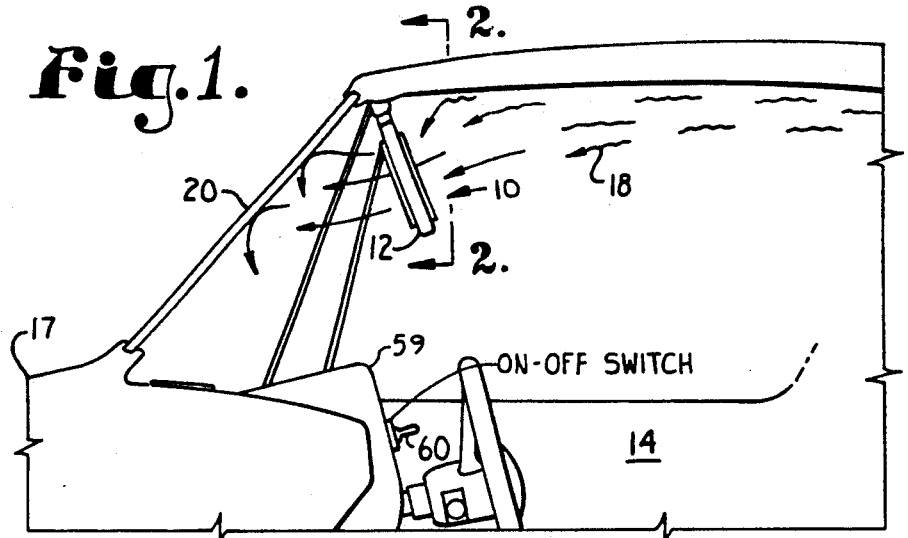
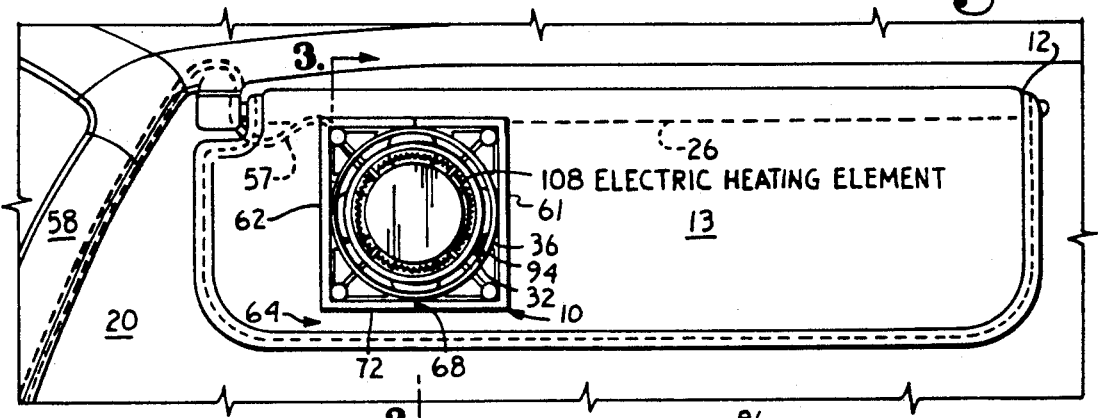
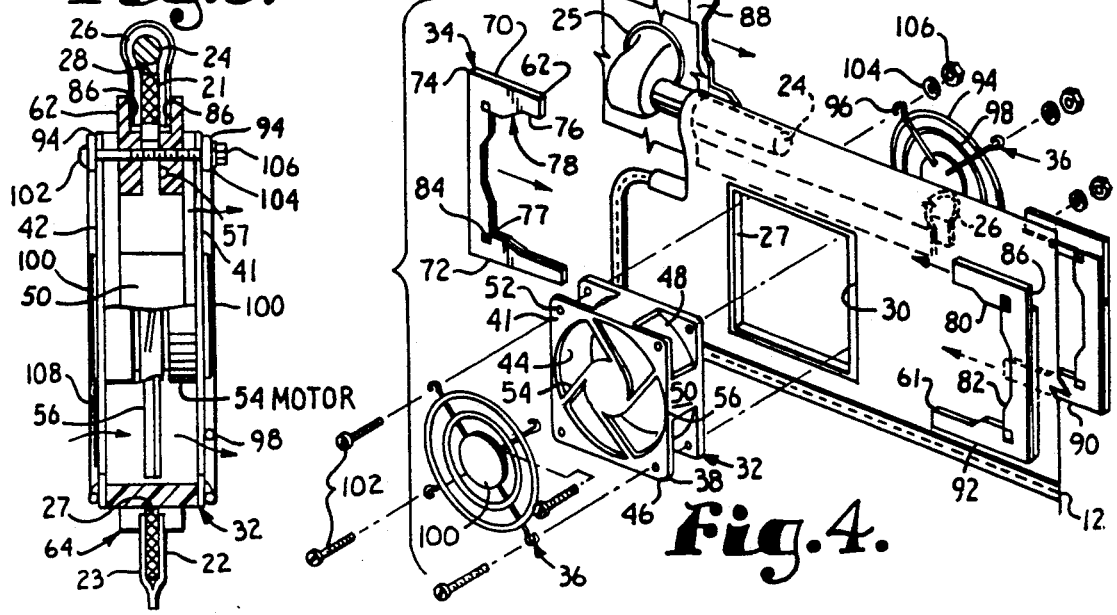

VEHICLE SUN VISOR HAVING AN ELECTRIC FAN AND HEATER ASSEMBLY FOR CLEARING THE VEHICLE WINDSHIELD

BACKGROUND OF THE INVENTION

1. Field of the Invention

The present invention relates generally to air handling systems, in particular to a fan system for mounting in an object, and more particularly to such a fan system for mounting in a vehicle visor.

2. Description of the Related Art

A wide variety of air handling devices has previously been proposed for conveying and distributing air for various purposes. Such purposes include heating, cooling, ventilating and drying of various objects and spaces. For example, forced air heating, ventilating and cooling (HVAC) systems are commonly used for environmental control in habitable structures for maintaining appropriate temperature and humidity levels for the comfort of the inhabitants.

Another area which involves air circulation for environmental control is in the vehicle field wherein forced air is commonly used for heating vehicle interiors. Heated air is also commonly used for clearing vehicle windshields and windows of condensation on the interior and ice on the exterior. Such condensation commonly occurs when a vehicle windshield or window is at a lower temperature than the vehicle interior, particularly if the air enclosed in the vehicle interior is relatively humid. Such defrosting systems can be used for evaporating condensation on the interior surface of a vehicle window or windshield, and for raising the temperature thereof to melt ice and/or snow on a vehicle window or windshield exterior surface.

Vehicles with water-cooled engines commonly have heater/defroster systems with heat exchangers and fans for circulating heated air to desired locations in the vehicle interiors.

Vehicles equipped with air-cooled engines, however, typically lack liquid engine coolant which can be circulated to a heat exchanger in a fan-driven air stream. Therefore, heat is sometimes drawn off of the relatively hot exhaust manifolds of air cooled engines for heating and defrosting purposes. For example, the engine cooling fan can be utilized for directly an air stream over a heat exchanger connected to an exhaust manifold, which air stream is then conveyed into the vehicle interior. However, such systems are often dependent upon engine speed and limited in effectiveness thereby. Furthermore, conveyance of an air stream from the engine compartment to the vehicle interior can be somewhat inefficient, with substantial heat losses occurring in route.

As an example of such a system, the Handley U.S. Pat. No. 1,586,428 discloses an attachment for automobiles which communicates air heated by a vehicle exhaust manifold to an apparatus mounted o the vehicle windshield for clearing same.

As another example of such a system, the Schackford U.S. Pat. No. 2,064,498 discloses a sleet and mist eliminating device for windshields which includes a fan mounted in a casing secured to a windshield frame portion.

Heretofore there has not been available a fan system with the advantages and features of the present invention, which addresses some or all of the aforementioned considerations.

SUMMARY OF THE INVENTION

In the practice of the present invention, a fan system is provided for mounting on an object including an air passage opening. The fan system includes a fan subassembly, a retainer subassembly and a grill subassembly. The fan subassembly includes a body with first and second faces and a throughbore extending therebetween. A retainer subassembly includes first and second retainer frames each adapted for mounting on the object and on the fan subassembly body adjacent to a respective face thereof. The retainer frames include flanges which are insertable into the fan subassembly body for securing it in place on the object. First and second grills are mounted on the fan subassembly body first and second faces respectively by mechanical fasteners which extend through the fan subassembly body and through the retainer frames. Electrical resistance heating wires are mounted on the grill subassembly for heating an airstream generated by the fan subassembly.

OBJECTS AND ADVANTAGES OF THE INVENTION

The objects and advantages of the present invention include: providing a fan system for mounting on an object with an opening; providing such a system which includes a fan subassembly for placement in the opening; providing such a system wherein the object can comprise a vehicle visor; providing such a system which facilitates defrosting and/or defogging a vehicle windshield; providing such a system which can be used in multiples in one or more visors of a vehicle; providing such a system which can easily be installed in a vehicle visor; providing such a system which provides effective defrosting and/or defogging capabilities for vehicles with air-cooled engines; providing such a system which is particularly well adapted for retro-fitting in existing vehicle visors; and providing such a system which can utilize commercially available fan subassemblies; providing such a system which provides a relatively finished appearance for a vehicle visor; and providing such a system which is economical to manufacture, efficient in operation and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a fan system embodying the present invention, shown mounted in a vehicle visor.

FIG. 2 is an elevational view of the fan system, showing a first side thereof.

FIG. 3 is an enlarged, vertical, cross-sectional view of the fan system taken generally along line 3—3 in FIG. 2.

FIG. 4 is an exploded perspective view of the fan system showing the construction and installation thereof in a vehicle visor with an opening.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 10 generally indicates a fan system embodying the present invention. Without limitation of generality of useful applications of the fan system 10, it is shown mounted in a visor 12 in the interior 14 of a vehicle 16. The fan system 10 is shown in FIG. 1 directing a flow of air represented by arrows 18 towards a windshield 20 of the vehicle 16. Although the fan system 10 is shown mounted in a passenger automobile visor, the fan system 10 can be mounted in various other objects, including visors in various other vehicles. The fan assembly 10 could also be mounted in panels, doors, walls, enclosures, etc., for effecting air circulation therethrough.

The visor 12 is constructed with a relatively rigid core consisting of a hardboard core panel 21 covered with layers of padding and vinyl 22, 23 respectively. The visor 12 includes a visor mounting rod 24, which can be pivotally connected to a bracket 25 mounted on a body 17 of the vehicle 16 for adjustable positioning. A metal, channel-shaped strap 26 is placed over the visor rod 24 and secured thereto, e.g., by spot welding. The strap 26 receives an upper edge 28 of the hardboard visor core panel 21.

A visor opening 27 is formed in the visor 12 and consists of a polygonal (e.g., square) core panel opening 29 in the core panel 21 surrounded on both sides by padding and vinyl openings 30 in the padding and vinyl layers 22, 23.

The fan system 10 generally comprises a fan subassembly 32, a retainer subassembly 34, and a grill subassembly 36.

II. Fan Subassembly 32

The fan subassembly 32 includes a fan subassembly body 38 with first and second faces 41, 42 and a throughbore 44 extending therebetween and open thereat. The fan subassembly body faces 41, 42 have generally polygonal (e.g., square) configurations with multiple corners 46 on each. Between each opposed pair of face corners 46 a respective body edge receiver 48 is formed which is outwardly open at a perimeter 50 of the body 38. Each face corner 46 includes a fastener hole 52, with opposed pairs of fastener holes 52 being generally aligned and having a respective body perimeter receiver 48 positioned therebetween.

A fan motor-and-blade subassembly or unit 54 is mounted in the throughbore 44 and includes multiple fan blades 56. The fan subassembly 32 can comprises a 12-Volt D.C. brushless unit available from Radio Shack Division of Tandy Corporation, Fort Worth, Texas 76102 (e.g., Archer Model No. 273-243B). A hot electrical lead 57 can extend from the fan motor-and-blade unit 54 around the visor bracket 25 and along an intersection 58 of the windshield 20 and a vehicle side post 58 to a vehicle dash 59 for connection to a dash-mounted switch 60. The fan motor-and-blade unit 54 can be grounded to the vehicle body 17. The wiring of the finished assembly can thus be substantially concealed from view.

III. Retainer Subassembly 34

The retainer subassembly 34 consists of a pair of retainer frames 64 each having first and second (right and left) frame halves 61, 62 which are interconnected in the installed frame 64 at upper and lower butt joints 66, 68 adjacent to upper and lower frame edges 70, 72 (see FIG. 2).

Each assembled retainer frame 64 has a generally polygonal (e.g., square) configuration with multiple corners 74 and an opening 76, which also has a generally polygonal configuration corresponding to the configuration of the frames 64 and has opening corners 77.

Each frame 64 includes a plurality of retainer flanges 78 each located in proximity to a respective frame corner 74 and projecting into the frame opening 76. Each retainer flange 78 includes horizontal and vertical legs 80, 82 extending substantially at right angles with respect to each other and a fastener hole 84 located generally at the intersection of the flange legs 80, 82. The opening 76 of each frame 64 thus has a generally square configuration with retainer flanges 78 protruding into each opening corner 77.

Each frame includes a recess 86 extending along its upper edge 70 and open at an inside face 88 of the frame. The recess 86 can extend from the frame upper edge 70 to the frame opening 76, with the adjacent retainer flanges 78 being substantially full thickness. The frame thickness at the recess 86 can be approximately half of the frame thickness elsewhere, and each frame half 61, 62 can be assembled from inner and outer layers 90, 92, the outer layer 92 being full height and the inner layer 90 having a lesser height to form the recess 86, which frame half layers 90, 92 are then attached together, e.g. by gluing.

IV. Grill Subassembly 36

The grill assembly 36 includes a pair of wire grills or guards 94 for protecting against contact with the fan blades 56. Each grill 94 can include a plurality (e.g., four) of grill fastener holes 96 located at positions corresponding to the frame fastener holes 84. Each grill 94 can include concentric wire rings 98 and a centered, circular face plate 100, which can display identifying indicia such as a logo or design. Electrical resistance heating wires 108 can be included in one or both of the grills 94.

Mounting means comprising mechanical fasteners are provided for mounting the grills 94 and can comprise, for example, screws 102 which extend through the grill fastener holes 96, the fan subassembly fastener holes 52 and the retainer frame fastener holes 84. The screws 102 receive washers 104 and nuts 106.

V. Installation and Operation

The fan system 10 is installed in a visor 12 by first cutting an appropriately sized opening 27 in the visor 12. The vinyl cover 23 and the padding 22 can be cut first to form the openings 30 with sizes slightly larger than the size of the opening 29 in the hardboard core panel 21 to permit sawing the hardboard core 29 without snagging the padding or vinyl layers 22, 23. A clearance area is thus formed around the hardboard core panel opening 29. The hardboard core panel opening 29 can be located adjacent to the metal visor strap 26. It may be preferably not to cut into the metal visor strap 26.

The fan subassembly 32 can then be placed in the visor opening 27 with its faces located slightly outboard of respective visor faces 13. The electrical resistance heating wires 108 can be placed in proximity to the grills 94 for heating an air flow from the fan system 10. Other heat sources could also be used, such as phase change chemicals, etc.

The frame halves 61, 62 are then slid along the visor faces 13 into position whereat the retainer flanges 8 are inserted into the face body receivers 48 inboard of he fan subassembly faces 41, 42. Preferably the frame halves 61, 62 engage to form the respective butt joints 66, 68.

The grills 94 are placed on the fan subassembly faces 41, 42 and the mechanical fastener screws 102 are inserted through the grill fastener holes 96, the fan subassembly face fastener holes 52 and the retainer frame fastener holes 84. The mechanical fastener screws 102 and the nuts 106 interact to threadably tighten and clamp the fan system 10 in place in the visor 12.

The fan system 10 can be wired to a vehicle electrical system as described above. Alternatively, batteries could be mounted adjacent to the fan system 10 for providing electrical power thereto. Other alternative electrical power sources include photovoltaic cells mounted in the visor or elsewhere in or on the vehicle.

The fan system 10 can be used in multiples in one or more vehicles visors.

The fan system 10 can be used for directing an airflow towards the vehicle windshield 20 as indicated by the airflow directional arrows 18, but the fan direction could be reversed for directing air into the vehicle interior 14. Still further, a double pull, double throw electrical switch 60 could be provided for actuating the fan assembly 10 in either direction for providing additional control over the operation of the fan assembly 10 in a forward or reverse mode of operation.

It is to be understood that while certain forms of the present invention have been illustrated and described herein, it is not to be limited to the specific forms or arrangement of parts described and shown.

What is claimed and desired to be secured by Letters Patent is as follows:

1. A fan system for mounting on an object with an opening, which comprises:
   (a) a fan subassembly including a body having a first face, a second face and a throughbore extending between and open at said faces, said fan subassembly also including fan motor means mounted on said body and fan blade means drivingly coupled to said motor means;
   (b) a retainer subassembly for mounting said fan subassembly body on the object with the fan subassembly body positioned in the object opening, said retainer subassembly including a retainer flange;
   (c) said fan subassembly body including a receiver receiving said retainer flange; and
   (d) said retainer subassembly includes first and second retainer frames each mounted in proximity to a respective fan subassembly body face.
2. Invention of claim 1, which includes:
   (a) each said retainer frame having a respective retainer frame opening; and
   (b) each said retainer frame opening receiving said fan subassembly body.
3. The invention of claim 2, which includes:
   (a) each said retainer frame having a respective retainer flange protruding into the retainer frame opening.
4. The invention of claim 3 wherein:
   (a) each said fan subassembly body face has a generally polygonal configuration with multiple corners; and
   (b) said fan subassembly body includes multiple receivers each located between respective opposed pairs of fan subassembly body face corners;
   (c) each said retainer frame opening has a generally polygonal configuration with multiple corners; and
   (d) each said retainer frame includes a plurality of said retainer flanges projecting into a respective opening thereof adjacent to a respective frame opening corner.
5. The invention according to claim 1, which includes:
   (a) a mechanical fastener extending through said fan subassembly body and said retainer subassembly, said mechanical fastener being connected to said fan subassembly body first and second faces.
6. The invention of claim 5, which includes:
   (a) first and second grills each mounted on a respective fan subassembly body face.
7. A fan system for mounting in a vehicle visor including an edge, a strap extending along the edge and an opening positioned in proximity to the strap, which 1 comprises:
   (a) a fan subassembly including:
      (1) a fan subassembly body with first and second faces and a throughbore extending between said faces and open thereat;
      (2) a fan motor-and-blade unit mounted at least partly within the fan subassembly body throughbore;
      (3) said fan subassembly body having a perimeter; and
      (4) a plurality of receivers in said body open at said body perimeter;
   (b) a retainer subassembly including first and second retainer frames each including an opening and a plurality of retainer flanges projecting into the retainer frame opening; and
   (c) a grill subassembly including a pair of grills each mounted on a respective fan subassembly body face and a plurality of mechanical fasteners extending through said grills, said fan subassembly body faces, and said retainer frames.
8. The invention of claim 7, which includes:
   (a) said fan subassembly body having a generally rectangular configuration with each face thereof having four corners;

(b) a respective body perimeter receiver located between each opposed pair of fan subassembly body face corners; and (c) each said retainer frame opening having a generally rectangular configuration with four corners and a respective retainer flange protruding into said retainer frame opening at each said retainer frame opening corner.

9. The invention according to claim 8, which includes:

(a) each said retainer frame having upper and lower edges and an inner face; and (b) each said retainer frame having a recess extending along the upper edge thereof and open at the inner face thereof.

10. The invention according to claim 9 wherein:

(a) each said retainer frame comprises inner and outer layers, said inner layer having a lesser height than said outer layer to define said recess.

11. The invention according to claim 7, which includes:

(a) each said retainer flange including a horizontal leg and a vertical leg extending at substantially right angles with respect to each other and forming an intersection therebetween; and (b) each said retainer flange including a retainer hole at a respective retainer flange leg intersection.

12. The invention according to claim 9 wherein each said recess is adapted to receive the visor strap.

13. The invention according to claim 8 wherein each said retainer frame includes first and second frame halves in engagement at upper and lower butt joints.

14. In combination with a vehicle visor including a visor rod, a bracket pivotally mounting the visor rod, a channel-shaped strap receiving strap receiving said visor rod and a hardboard core panel with an upper edge received in said strap and a generally rectangular opening in proximity to said strap, the visor being mounted in a vehicle with an electrical system, the improvement of a fan system which comprises:

(a) a fan subassembly mounted in said visor opening and including:

(1) a fan subassembly body with first and second generally rectangular faces having four fan subassembly body face corners each, a throughbore extending between and open at said faces, a perimeter, four retainer receivers each located between a respective opposed pair of fan subassembly body face corners and open at said perimeter;

(2) a fan motor-and-blade unit mounted within said body throughbore;

(3) each said fan subassembly body face corner having a fan body fastener hole;

(4) an electrical lead extending from said fan motor-and-blade unit to the vehicle electrical system; and (5) a double-pole, double-throw electrical switch electrically interconnecting said fan motor-an-blade unit and the vehicle electrical system;

(b) a retainer subassembly including:

(1) first and second retainer frames each comprising left and right retainer frame halves and each including a retainer frame opening with a generally rectangular configuration including four corners;

(2) each said retainer frame including a retainer flange comprising horizontal and vertical legs extending substantially at a right angle with respect to each other and forming an intersection;

(3) each said retainer flange including a retainer flange fastener hole;

(4) each said retainer frame including upper and lower edges and an inner face; and (5) each said retainer frame including a recess extending along said upper edge and open at said inner face;

(6) said retainer subassembly fixedly mounting said fan subassembly in the visor; and (c) a grill subassembly including:

(1) a pair of grills each having a plurality of concentric rings, a centered, circular face plate and four grill fastener holes located in a generally rectangular pattern; and (2) four mechanical fasteners each extending through respective opposed pairs of grill fastener holes, body fastener holes, retainer frame fastener holes and the visor opening.

15. The invention of claim 14 wherein:

(a) said grill subassembly includes heat source means for heating an air flow through the fan system.

16. The invention of claim 15 wherein:

(a) said heat source means comprises electrical resistance wire heater means.

* * * * *